(12) United States Patent
Hladik et al.

(10) Patent No.: US 8,628,166 B2
(45) Date of Patent: Jan. 14, 2014

(54) INKJET RECORDING MATERIAL

(75) Inventors: Molly Hladik, Nixa, MO (US); Lisa A. Underwood, Escondido, CA (US); Christopher Arend Toles, Escondido, CA (US); Xi Zeng, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 58 days.

(21) Appl. No.: 13/384,728

(22) PCT Filed: Nov. 6, 2009

(86) PCT No.: PCT/US2009/063593
§ 371 (c)(1),
(2), (4) Date: Jan. 18, 2012

(87) PCT Pub. No.: WO2011/056178
PCT Pub. Date: May 12, 2011

(65) Prior Publication Data
US 2012/0120149 A1     May 17, 2012

(51) Int. Cl.
*B41J 2/015*     (2006.01)
(52) U.S. Cl.
USPC ............................ 347/20; 347/101; 347/105
(58) Field of Classification Search
None
See application file for complete search history.

(56) References Cited

U.S. PATENT DOCUMENTS

| | | | |
|---|---|---|---|
| 6,698,880 B1 | 3/2004 | Campbell et al. | |
| 6,703,086 B2 * | 3/2004 | Kronzer et al. | 428/32.16 |
| 6,753,051 B1 | 6/2004 | Landry-Coltrain et al. | |
| 6,793,860 B2 | 9/2004 | Xing et al. | |
| 6,818,367 B2 | 11/2004 | Priebe et al. | |
| 6,866,383 B2 * | 3/2005 | Naik et al. | 347/105 |
| 7,410,675 B2 | 8/2008 | Busch et al. | |
| 7,521,173 B2 | 4/2009 | Dontula et al. | |
| 2002/0001697 A1 | 1/2002 | Xing et al. | |
| 2004/0185193 A1 | 9/2004 | Taka et al. | |
| 2005/0008795 A1 | 1/2005 | Dungworth et al. | |
| 2005/0030363 A1 * | 2/2005 | DeVries et al. | 347/106 |
| 2006/0222789 A1 | 10/2006 | Dontula et al. | |
| 2006/0251866 A1 * | 11/2006 | Zhou et al. | 428/195.1 |
| 2006/0292318 A1 | 12/2006 | Parrinello et al. | |
| 2007/0003714 A1 | 1/2007 | Nakano et al. | |
| 2007/0031615 A1 | 2/2007 | Nair et al. | |
| 2008/0050542 A1 | 2/2008 | Matsuura et al. | |
| 2009/0114121 A1 | 5/2009 | Morohoshi et al. | |
| 2009/0214805 A1 | 8/2009 | Kobayashi | |

FOREIGN PATENT DOCUMENTS

| | | |
|---|---|---|
| EP | 0908324 | 4/1999 |
| EP | 0963947 | 12/1999 |
| EP | 1460114 | 9/2004 |
| JP | 08-286319 | 11/1996 |
| JP | 10-212367 | 8/1998 |
| JP | 2000053710 | 2/2000 |
| JP | 2000247023 | 9/2000 |
| JP | 2000263925 | 9/2000 |
| JP | 2001301001 | 10/2001 |
| JP | 2004082690 | 3/2004 |
| JP | 2005186449 | 7/2005 |
| JP | 2008265324 | 11/2008 |
| JP | 2009535463 | 10/2009 |

\* cited by examiner

*Primary Examiner* — Matthew Luu
*Assistant Examiner* — Michael Konczal

(57) ABSTRACT

An inkjet recording material which comprises an extruded mixture of thermoplastic polymers and non-chlorinated polyolefin materials. The mixture contains from 0.5 wt % to 30 wt % of non-chlorinated polyolefin materials based on the total weight of the polymers constituting the material.

15 Claims, 4 Drawing Sheets

Ex 2A                Ex 2B                Ex 2C

Ex 2A　　　　　　　Ex 2B　　　　　　　Ex 2C

Ex 3A　　　　　　　Ex 3B　　　　　　　EX 3C

Ex 4A            Ex 4B

Ex 11A

Ex 11B

Ex 11C

INKJET RECORDING MATERIAL

BACKGROUND

Inkjet technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of substrates. Current ink jet printing technology involves forcing the ink drops through small nozzles by thermal ejection, piezoelectric pressure, or oscillation, onto the surface of a media. The inkjet printing technique is extremely versatile in terms of the variety of substrate material that can be treated, as well as the print quality and the speed of operation that can be achieved.

Therefore, inkjet printing is nowadays becoming a popular way of recording images on various media surfaces and inkjet printers have found broad applications across markets, ranging from industrial labeling to short run printing, to desktop document, pictorial imaging and large format printing for outdoor applications such as banners, displays, posters, billboard and vehicle wraps.

Both dyes and pigments have been used as colorants for such inkjet ink formulations. However, such materials do not always adhere well to the substrates to which the ink is applied, especially when the ink formulations contain latex. The resulting printed image might have durability issues such as abrasion resistance, light-fastness, solvent-fastness and water-fastness. Furthermore, images created employing inkjet printing methodology may tend to run or smear upon repeated contact or may be removed easily from the printed surface.

In inkjet printing method, the receiving media substrates play a key role in the overall image quality and permanence of the printed images. Thus, it has often created challenges to find media which can be effectively used with such printing techniques and which have good image quality and good adhesion capability.

BRIEF DESCRIPTION OF THE DRAWINGS

In order to better understand the invention, some embodiments will be described below by way of non-limiting examples only, with reference to figures, wherein.

DETAILED DESCRIPTION

Figure 1:
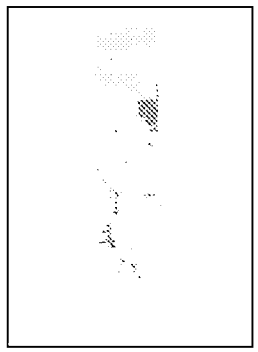
FIGS. 1 to 5 are pictures of the removed tape that illustrate the amounts of ink transferred to the tape when printed on different inkjet recording materials according to embodiments of the present invention.
Figure 1:
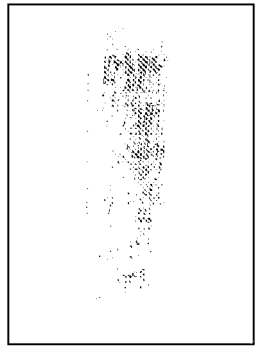
Figure 1:
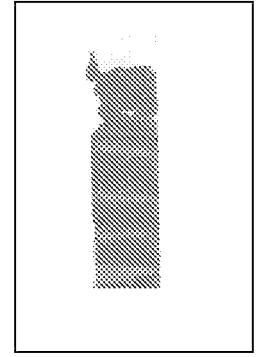

Embodiments of the present disclosure will employ, unless otherwise indicated, techniques of synthetic organic chemistry, ink chemistry, media chemistry, printing chemistry, and the like, that are within the skill of the art. Such techniques are explained fully in the literature. The following examples are put forth to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere. Unless otherwise indicated, the viscosity is expressed in cP and is measured at a temperature of 25° C.

Before the embodiments of the present disclosure are described in detail, it is to be understood that, unless otherwise indicated, the present disclosure is not limited to particular materials, and processes disclosed herein as such may vary to some degree. It is also to be understood that the terminology used herein is for purposes of describing particular embodiments only, and is not intended to be limiting, as the scope of the present invention will be defined only by the appended claims and equivalents thereof.

In the present specification, and in the appended claims, the following terminology will be used: the singular forms "a", "an", and "the" include plural referents unless the context clearly dictates otherwise. Thus, for example, reference to "a support" includes a plurality of supports. The terms "about" and "approximately," when referring to a numerical value or range is intended to encompass the values resulting from experimental error that can occur when taking measurements. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to approximately 20 wt % should be interpreted to include not only the explicitly recited concentration limits of 1 wt % to approximately 20 wt %, but also to include individual concentrations such as 2 wt %, 3 wt %, 4 wt %, and sub-ranges such as 5 wt % to 15 wt %, 10 wt % to 20 wt %, etc.

As used herein, "images" refers to marks, signs, symbols, figures, indications, and/or appearances deposited upon a material or substrate with either visible or an invisible ink composition. Examples of an image can include characters, words, numbers, alpha-numeric symbols, punctuation, text, lines, underlines, highlights, and the like.

The present disclosure provides inkjet recording material. In an embodiment, such recording or receptive material is an inkjet recording material well adapted for inkjet printing device. In an embodiment, such inkjet recording material is an inkjet media well adapted for inkjet printing device. The inkjet recording material includes an extruded mixture of thermoplastic polymers and non-chlorinated polyolefin materials. In an embodiment, said extruded mixture includes from 0.5 wt % to 30 wt % of non-chlorinated polyolefin materials based on the total weight of the polymers constituting the material.

As used herein, an extruded mixture means that the mixture has been fabricated using an extruder and/or via an extrusion process. By "recording", it is meant herein that the material is able to be receptive to the ink and has good capacity to record ink that is printed thereon.

In an embodiment, the inkjet recording material has the form of a layer and might be, although it is not mandatory, applied to a supporting substrate. In another embodiment, the material is an extruded film having the form of a layer that can be deposited or extruded on supporting substrates of different natures, such as paper, another film, another extruded polymer, etc.

In another embodiment, the present disclosure refers to a method of fabricating an inkjet recording material wherein said mixture is extruded onto a supporting substrate. In another embodiment, the present disclosure refers to a method of forming printed images on inkjet recording material including the step of projecting a stream of droplets of latex-based ink composition onto said surface to form the desired printed image.

The material of the present disclosure, when used in an inkjet printing process, provides a good image quality and has a structure which is receptive and which presents excellent adherence properties to the ink deposed thereon. Indeed, the ink receptive materials of the present disclosure are inherently ink receptive, meaning thus that they avoid the need for top-coating or reliance on a voided microstructure to gain ink receptivity. Ink recording material of embodiments of this disclosure provides excellent image properties and optics quality that are superior to those provided by other materials, such as materials having voided microstructures. Furthermore, the ink receptive materials according to embodiments of the present disclosure are fabricated in a manner that avoids the need for multiple time consuming and costly process steps. Indeed, the present inkjet recording material is an uncoated material and it can be directly used, i.e., without having the further coating step.

Furthermore, the inkjet recording material according to embodiments of the present disclosure, when used in inkjet printing with latex-based inks, imparts good image quality and improved durability and adhesion performances. Thus, without being bound by the theory, it is believed that the two polymers present in the inkjet recording material, when printed with latex-based inkjet inks, act synergistically in view of providing improved adhesion property. The latex-based inks will have a superior adherence and enhanced image permanence when printed in such material. Thus, the inkjet recording material according to embodiments of the present disclosure provides enhancing image quality and enhanced image permanence of inkjet printed image.

In an embodiment of the present invention, the ink recording material includes an extruded mixture of thermoplastic polymers and non-chlorinated polyolefin materials wherein said mixture includes from 0.5 wt % to 30 wt % of non-chlorinated polyolefin materials based on the total weight of the polymers constituting the material.

In an embodiment of the present invention, the ink recording material can be of any type and size. In an embodiment of the present invention, the ink recording material is a layer. In another embodiment, the ink recording material has a thickness ranging between about 0.01 mm and about 0.15 mm. Thus, in an embodiment, the ink recording material has the form of a layer and has a thickness ranging between about 0.01 mm and about 0.15 mm. In another embodiment, the ink recording material has the form of a film and has a thickness ranging between about 0.015 mm and about 0.06 mm.

As used herein the term polyolefin refers to a polymer produced from a simple olefin as a monomer. In other words, the term polyolefin refers to an alkene polymer having the general formula $C_nH_{2n}$. In an embodiment, non-chlorinated polyolefin materials are used as adhesion promoters and are developed as an alternative to standard chlorinated polyolefins.

In an embodiment of the present disclosure, the polyolefin materials are non-chlorinated polyolefin materials, meaning thus that said polyolefins do not contain any chlorinated compound grafted to the polyolefin polymer. By chlorinated polymer, it is meant herein any polymer containing the element chlorine.

In an embodiment of the present disclosure, the ink receptive material includes an amount of non-chlorinated polyolefin materials which is comprised between 0.5 wt % and 30 wt % based on the total weight of the polymers constituting the material. In another embodiment, the ink receptive material includes an amount of non-chlorinated polyolefin materials which is comprised between 1 wt % and 20 wt % based on the total weight of the polymers constituting the material. In yet another embodiment, the ink receptive material includes an amount of non-chlorinated polyolefin materials which is comprised between 10 wt % and 15 wt % based on the total weight of the polymers constituting the material.

In an embodiment of the present disclosure, the non-chlorinated polyolefin material is selected from the group consisting of polyethylene, polypropylene, polymethylpentene, polybutylene polymer and mixtures thereof. In another embodiment, the non-chlorinated polyolefin material is polyethylene, polypropylene or ethylene vinyl acetate polymer.

In an embodiment of the present invention, the non-chlorinated polyolefin material is a graft-copolymerized polyolefin polymer and includes, for example, maleic acid, itaconic acid, citraconic acid, acrylate modified polyolefin and acid anhydride, such as maleic anhydride and itaconic anhydride. In another embodiment of the present invention, the non-chlorinated polyolefin material is a maleic anhydride and/or an acrylate modified polyolefin.

In an embodiment, the amount of polyolefin to be graft-copolymerized is from 0.1 to 10% by weight, and, in another embodiment, from 1 to 5% by weight. The method for graft-copolymerizing the polyolefin with the maleic anhydride and acrylate includes a known method such as solution or melting method in the presence of organic peroxide as a radical generator.

In an embodiment, the non-chlorinated polyolefin material is a non-chlorinated polyolefin copolymer. Examples of polyolefin copolymer include copolymer of polyethylene, propylene and ethylene such as hexene, butene and octene. The polyolefin may also be copolymerized with one or more copolymers including polyesters, such as polyethylene terephthalate, polysulfone, polyurethane, polyvinyl, polycarbonate, cellulose esters, such as cellulose acetate and cellulose propionate, and polyacrylate. In another embodiment of the present invention, examples of non-chlorinated polyolefin material include: maleic anhydride and acrylic grafted polyolefin or maleic anhydride and acrylic grafted-modified polyolefin such as polypropylene, polyethylene, ethylene vinyl acetate, ethyl methyl acrylate, ethylene ethyl acrylate, ethyl acrylic acid, ethyl glycidyl methacrylate, ethyl-n-butyl acrylate and copolymers, terpolymers and mixtures thereof.

In another embodiment of the present invention, non-chlorinated polyolefin material is a maleic anhydride modified polyolefin such as modified polypropylene, modified polyethylene, modified ethylene vinyl acetate, modified ethyl methyl acrylate, modified ethyl acrylic acid, and copolymers and mixtures thereof. In another embodiment of the present invention, non-chlorinated polyolefin material is maleic anhydride and acrylic grafted polyolefin polymer. Maleic anhydride and acrylic grafted modified polyolefin is available, for example, from Nippon Paper Group under the product name Auroren®.

Without being limited by any theory, it has been found that mixing a specific amount of maleic anhydride and acrylate modified polyolefin into an extruded thermoplastic base polymer provides improved adhesion of latex-based ink composition to the extruded material.

In an embodiment, the base polymer consists of thermoplastic polymer. In an embodiment of the present disclosure, the ink receptive material includes an amount of base thermoplastic polymer which is comprised between 70 wt % and 99.5 wt % based on the total weight of the polymers constituting the material. In another embodiment, the amount of thermoplastic polymer is comprised between 80 wt % and 99 wt % based on the total weight of the polymers constituting the material.

In an embodiment, thermoplastic polymer is any polyethylene (PE), polypropylene (PP), polyethylene terephthalate (PET), polystyrene, polycarbonate and polyamide polymer. In an embodiment of the present invention, the base thermoplastic polymer is polyethylene (PE). In another the base polymer is low density polyethylene (LDPE) and/or high density polyethylene (HDPE). In yet another embodiment, the thermoplastic base polymer is low density polyethylene (LDPE). In another embodiment of the present invention, the thermoplastic base polymer is polypropylene (PP). In an embodiment of the present invention, the thermoplastic base polymer is ethylene vinyl acetate (EVA) polymer.

As used herein, LDPE is a polymer made up of ethylene monomer ($CH_2CH_2$). As LDPE, it is meant herein low density polyethylene which has a density range of 0.910-0.940 g/cm$^3$. In an embodiment, LDPE has a high degree of short and long chain branching. In another embodiment, LDPE is a partially (from about 50% to about 60%) crystalline solid melting at about 115° C.

As used herein, EVA is a copolymer of ethylene and vinyl acetate. In another embodiment, EVA is a copolymer vinyl acetate and of low density polyethylene (LDPE). In an embodiment, the weight percent vinyl acetate, contained in the EVA polymer, is from about 10% to about 40%, with the remainder being ethylene. In another embodiment, EVA has a level of vinyl acetate which is in the range of about 15% to about 25% by total weight of the polymer. EVA polymer is available from DuPont under the trade name Elvax© or is available from Westlake Chemical Corporation under the name "ethylene-vinyl acetate low density polyethylene" (EB-grades).

In another embodiment, the thermoplastic polymer can be formed from a variety of different thermoplastic polymers depending on the substrate and application. Suitable thermoplastic polymers include meltable, film-forming substances selected from the group of materials including polyethylenes, polypropylenes and polybutylenes, polyvinyl chlorides, polyamides, polyesters, polystyrenes, polyurethanes, polyacrylates, polyvinyl acetate, polysulfone, polyethylene methyl acrylates (EMA), polyethylene methacrylic acids (EMAA), polyethylene ethyl acrylate, nylons, polyvinyl pyrillidone, polyether esters, polyether amides, polycarbonates, styrene acry-lonitrile polymer, ionomers based on sodium or zinc salts of ethylene/methacrylic acid, polymethyl methacrylates, cellulosic, fluoroplastics, acry-lonitrile butadiene styrene polymer, polyethylenevinyl alcohol, and copolymers and mixtures thereof.

In another embodiment, the thermoplastic polymer useful for forming the material according to the present disclosure has a processing temperature within the range of from about 120° C. to about 290° C.

Examples of thermoplastic materials include polypropylene homopolymers and copolymers available from Union Carbide Corporation, under the name UCC Polypropylene®. Examples of thermoplastic materials include polyesters available, for example, from Eastman Chemical Company, under the product name Eastar8®, and polyethylenes available, for example, from Dow Chemical Company, under the product name DowlexS®.

In an embodiment, the ink recording material according to the present disclosure includes additives such as fillers, pigments, processing, and/or performance aids. In an embodiment, the additives are added to the mixture before the extrusion process or are added during a separate compounding step.

In another embodiment, the ink recording material according to the present disclosure includes filler. Examples of filler include, but are not limited to, ground calcium carbonate, precipitated calcium carbonate, titanium dioxide, clay, silicate, plastic pigment, alumina trihydrate, and/or mixtures thereof. In another embodiment, the ink recording material includes clay. In another embodiment, the ink recording material according to the present disclosure includes kaolin clay. In yet another embodiment, the ink recording material includes calcined kaolin clay. In one exemplary embodiment, the amount of filler ranges from about 0.1 wt % to about 10 wt % of the total weight of the material and, in another embodiment, the amount of filler ranges from about 0.5 wt % to about 5 wt % of the total weight of the material.

In an embodiment of the present disclosure, the ink receptive material is formed by an extrusion process. Thus, the ink recording material of the present disclosure is formed by extruding a mixture of thermoplastic base polymer and non-chlorinated polyolefin material into a desired sheet thickness. The ink recording material can be made according to various extrusion operations like extrusion coating, lamination, hot melt extrusion or modification of cast extrusion or coating operation. In another embodiment, ink receptive material is formed by a co-extrusion process, by a cast extrusion process, by an injection mold extrusion or by a blown extrusion process. In another embodiment, the ink receptive material is made by hot melt extrusion technique. As used herein, the terms extrude and hot melt extrusion refer to process wherein the material is heated to a temperature at, or above, its melting point and deposited on a moving substrate at a substantially uniform thickness.

In an embodiment, the extrusion process may be practiced within a wide range of extrusion temperatures, for example, from 120° C. to 350° C., and speeds, for example, from 60 m/min to 460 m/min, depending on the particular intended application of the material. In an embodiment, the extrusion temperature ranges from 150° C. to 290° C.

In an embodiment, in such extrusion processes, the polymer mixture is first subjected to heat and pressure inside the barrel of an extruder. The molten polymer is then forced through the narrow slit of an extrusion-coating die by an extruder screw. At the exit of the die slit, a molten curtain emerges. In an embodiment, this molten curtain is drawn down from the die into a nip between two counter-rotating rolls, a chill roll and pressure roll. In another embodiment, while coming into contact with a faster moving substrate in the nip formed between the chill roll and the pressure roller, a hot film is drawn out to the desired thickness, forming a layer with a specific thickness onto the substrate.

In an embodiment, the thermoplastic polymer and the non-chlorinated polyolefin additive can be compounded in a separate step before the extrusion process. In an embodiment, the pellets resulting from this compounding step are later put into the extrusion process outlined above.

Thus, in an embodiment, the ink recording material is produced by forming an extruded film from a mixture of thermoplastic base polymers and of non-chlorinated polyolefin materials. In another embodiment, the present disclosure relates to a method of fabricating an inkjet recording material such as defined above including the steps of preparing a mixture of thermoplastic base polymers and of non-chlorinated polyolefin materials and extruding said mixture in the form of a film onto a supporting substrate for the purposes of making a printable material.

In an embodiment of the present disclosure, the inkjet recording material can be used as a coating for substrate which means that the coating can be applied onto supporting substrate. Examples of supporting substrate include, but are not limited to, resin coated papers (so-called photo-base papers), papers, clear films, scrim banners, banners, coated papers, fabrics, art papers (e.g., water color paper), plastic film of any kind and the like. The substrate includes porous and non-porous surfaces. In an embodiment, the substrate is paper.

In another embodiment the supporting substrate is a scrim banner which is a woven-core of polymer tapes (LDPE, HDPE, PVC, and Polyester, for example) with an extruded coating layer locking them together. Such products are available from Fabrene Corporation or from Interwrap Inc.

In an embodiment, the ink recording material is applied onto a supporting substrate either by a process of multi-layer co-extrusion with the substrate and recording layering in the form of a hot melt, by extrusion coating onto the preformed recording material layer in the form of a hot melt. In an embodiment, the inkjet recording material is applied onto a supporting substrate in the form of a layer.

In an embodiment, when the inkjet recording material is applied onto a supporting substrate in the form of a layer, in order to achieve the desired surface roughness for the inkjet recording media, an appropriate cooling roller or chill roll in the extrusion process can be used. Chill rolls containing different textures (such as matte) are available and used. Thus, the material can be passed between a chill roll and pressure roll that presses the coating onto the substrate to ensure complete contact and adhesion. In an embodiment, such supporting substrate is a woven scrim polyethylene (PE).

In an embodiment, the present disclosure provides a method of forming printed images on ink recording material such as defined herein, using a latex inkjet ink composition. In another embodiment, the method of forming printed images on ink recording material, such as defined herein, using the latex inkjet ink composition is done in a heated environment. The method includes the step of projecting a stream of droplets of the ink composition onto said ink recording material to form the desired printed image. The latex inkjet ink composition may be established on the material via any suitable inkjet printing technique. Non-limitative examples of such inkjet printing techniques include thermal, acoustic, continuous and piezoelectric inkjet printing.

In an embodiment of the present disclosure, the ink recording material mentioned herein is specifically adapted to be used with inkjet ink composition. In another embodiment, the material mentioned herein is specifically adapted to be used with latex inkjet ink composition. As latex inkjet ink composition or latex-based ink composition, it is meant herein an ink composition containing polymeric latex. By inkjet composition, it is meant herein that the composition is very well adapted to be used in an inkjet device and/or in an inkjet printing process.

In yet another embodiment, the material mentioned herein is specifically adapted to be used with UV-curable inkjet ink composition. As UV-curable ink composition, it is meant herein an ink composition containing UV-curable materials.

Thus, in an embodiment, the material of the present disclosure is used in combination with a latex inkjet ink composition. The composition used herein is, therefore, a composition including polymeric latex. In an embodiment, the polymeric latex is suspended or dissolved in an ink vehicle. In another embodiment, the material of the present disclosure is used in combination with a UV-curable inkjet ink composition. In yet another embodiment, the material of the present disclosure is used in combination with a latex inkjet ink composition containing UV-curable materials.

The polymeric latex refers herein to a group of preparations consisting of stable dispersion of polymeric micro-particles dispersed in the aqueous vehicle of the ink. In an embodiment, the polymeric latex is natural latex or synthetic latex. Synthetic latices are, usually, produced by emulsion polymerization using a variety of initiators, surfactants and monomers. There is no specific limitation on chemical composition of latex. Furthermore, there is no limitation of the surface charge of the polymeric latex. In an embodiment, the polymeric latex is cationic, anionic, or amphoteric polymeric latex. In another embodiment, the polymeric latex is selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers, acrylonitrile-butadiene polymers or copolymers.

In an embodiment of the present invention, the ink composition referred herein includes one or more colorants that impart the desired color to the printed message. As used herein, "colorant" includes dyes, pigments, and/or other particulates that may be suspended or dissolved in an ink vehicle. The colorant is generally present in the ink composition in an amount required to produce the desired contrast and readability. In an embodiment, according to the present invention, the inks include pigments as colorants. Pigments that can be used include self-dispersed pigments and non self-dispersed pigments. In an embodiment, suitable pigments are black pigments, white pigments, cyan pigments, magenta pigments, yellow pigments, or the like. Pigments, according to an embodiment of the present invention, are organic or inorganic particles as well known in the art.

As used herein, "liquid vehicle" is defined to include any liquid composition that is used to carry colorants, including pigments, to a substrate. Liquid vehicles are well known in the art, and a wide variety of liquid vehicle components may be used. Such liquid vehicles may include a mixture of a variety of different agents, including without limitation, surfactants, solvents and co-solvents, buffers, biocides, viscosity modifiers, sequestering agents, stabilizing agents and water. Though not liquid per se, the liquid vehicle can also carry other solids, such as polymers, UV curable materials, plasticizers, salts, etc.

In an embodiment, the present disclosure relates to a method of enhancing image quality and adhesion of inkjet printed image, including the step of, firstly, obtaining an inkjet recording material including an extruded mixture of non-chlorinated polyolefin materials and of thermoplastic polymers. Then, the method includes the step of inkjetting a latex-based ink composition onto the inkjet recording material, to form a printed image and drying the printed image in view of providing a printed medium with enhanced image quality and enhanced image permanence and adhesion to said material.

In an embodiment, the inkjet recording material is used with any suitable inkjet printer and with any latex-based inkjet ink that is ordinarily used for inkjet printing. One of such printer is HP L25500 and HP L65500 (Hewlett-Packard Corporation).

The extruded mixture of polymers provides thus a final inkjet recording material having the capacity for receiving and retaining the ink. When printed with latex-based inks, embodiments of the inkjet recording material provides good image quality and enhanced image adhesion to said material.

Ink receptive materials of the present disclosure are referred as being "inherently" ink receptive, or inkjet printable, because the material surface structure is engineered to be receptive to an ink medium without any subsequent further top coating, or treating (e.g., corona treating or the like), and without depending on a voided or porous microstructure. Rather, materials produced according to this disclosure have a surface formed from a specially extruded blend of non-chlorinated polyolefin materials and thermoplastic polymers, which provides superior ink receptive and adhesive properties when compared to conventional materials having coated or voided surfaces.

The following examples illustrate a number of embodiments of the present systems and methods that are presently known. However, it is to be understood that the following are only exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements. Thus, while the present disclosure has been described above with particularity, the following examples provide further detail in connection with what are presently deemed to be the acceptable embodiments.

EXAMPLE 1

Extruded Film Formation

Inkjet recording materials, having the form of a film, including various level of thermoplastic polymers and non-chlorinated polyolefin materials (NCPO), illustrated in table (a), are prepared by using an extrusion system having a vertical single screw extruder A series of hot melt extrusions, based on mixture according to table (a), are extruded onto a polystyrene base substrate using a ¾" recirculator screw run at a temperature ranging from about 350° F. (177° C.) to about 390° F. (199° C.). Thermoplastic polymers and non-chlorinated polyolefin materials are mixed prior to being poured into the hopper (which feeds into the screw and then ultimately into the extrusion die). The extrusions process is done with a 10" wide extrusion die and with a 12" (30.5 cm) wide Matte Finish primary cooling roll at a temperature of 177° C. The samples are then run with a polystyrene base substrate between the extruded film and the chill roll in order to increase pressure contact time to allow for better adhesion of the film to the polystyrene base substrate. The resulting film has a thickness of 1 mm. During the extrusion process two important aspects are tracked to determine applicability to the final product: the film adhesion to base substrate and the "melt strength", which mean that the film is elastic enough to stretch during the extrusion from die to chill roll.

Such process is repeated several times using a mix of different level non-chlorinated polyolefin materials (Auroren®3535) and different thermoplastic polymers and (LDPE, EVA, PP) in view of producing different films. The mixture compositions are illustrated in table (a) below. The amounts are expressed in weight percentage (wt %) of the total weight of material.

TABLE a

| Example ID | NCPO | NCPO Content (%) | thermoplastic polymer |
| --- | --- | --- | --- |
| Ex 2A | Auroren ®353 | 15 | LDPE |
| Ex 2B | Auroren ®353 | 20 | LDPE |
| Ex 2C | Auroren ®353 | 0 | LDPE |
| Ex 3A | Auroren ®353 | 10 | EVA + LDPE |
| Ex 3B | Auroren ®353 | 1 | EVA + LDPE |
| Ex 3C | Auroren ®353 | 0 | EVA + LDPE |
| Ex 4A | Auroren ®353 | 10 | PP |
| Ex 4B | Auroren ®353 | 0 | PP |

Auroren ®353S is a non-chlorinated polyolefin material (NCPO), available from Nippon Paper Group. Auroren ®353S consists essentially of polyolefins modified with maleic anhydride and acrylic and has a molecular weight of about 9000.

Thermoplastic polymers are low density polyethylene (LDPE) polymer (Westlake LDPE Grade EC474, available from Westlake Chemicals, Houston, Tex.); ethylene vinyl acetate/LDPE (EVA) polymer (Westlake 4% EVA Copolymer Grade EF439, available from Westlake Chemicals, Houston, Tex.); and polypropylene polymer (PP) (available from Innovene, Chicago, Ill.).

EXAMPLE 2

Adhesion Test

A series of latex ink drawdowns are made based on the mix described in table (a) of example 1. The ink drawdowns are printed with latex-based cyan ink, in a film using a #8 Meyer rod drawn onto the substrate which is laying on a heated metal platen at about 70° C.

The samples are then dried on a 70° C. heated platen from below and by heat gun from above until the ink is "set" and no transfer occurred when touched. The samples are then subjected to an adhesion test, using a "tape peel" test in which a piece of adhesive tape (3M tape #610) is applied to the ink layer and left to sit for 1 minute. The tape is then removed.

Figure 2:
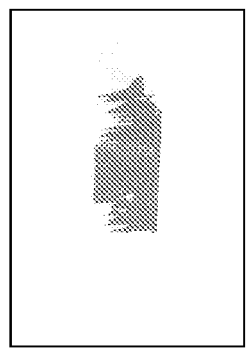
Figure 2:
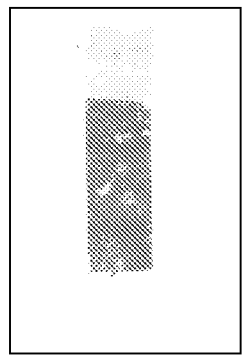
Figure 2:
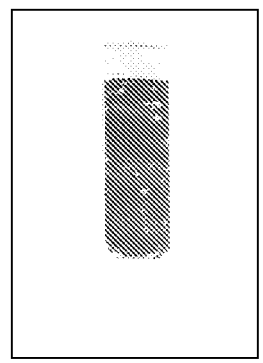
Figure 3:
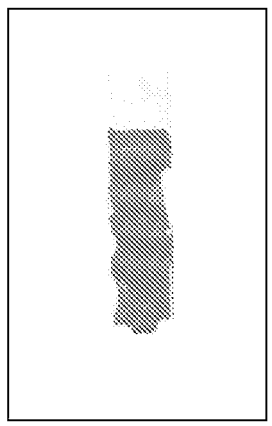
Figure 3:
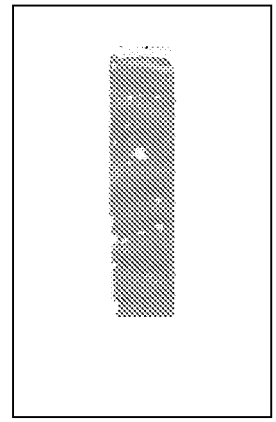

FIGS. 1, 2 and 3 illustrate the removed tape. The amount of ink transferred to the tape is visually analyzed and evaluations are reported in the table (b). In table (b), "−" indicates low levels of ink transfer to the tape and "+" indicates high levels of ink transfer. An improved adhesion is shown by lower amounts of ink transferred to the tape. The results are illustrated in table (b).

TABLE b

| Example ID | Amounts of ink transferred to the tape. |
| --- | --- |
| Ex 2A | −− |
| Ex 2B | −− |
| Ex 2C | ++ |
| Ex 3A | − |
| Ex 3B | + |
| Ex 3C | ++ |
| Ex 4A | − |
| Ex 4B | ++ |

Such results demonstrate that the presence of non-chlorinated polyolefin material, in thermoplastic polymer, leads to an increase adhesion of the ink to the material. Furthermore, such results demonstrate that the nature of the thermoplastic polymer has an impact on adhesion.

EXAMPLE 3

Extruded Film Formation Containing Filler

Inkjet recording materials, having the form of a film, including base thermoplastic polymers, non-chlorinated polyolefin materials and fillers, in various level such as illustrated in table (c), are prepared by using an extrusion system having a vertical single screw extruder. A hot melt extrusion of LDPE thermoplastic polymer with different levels of fillers (Ansilex®93) as well as with non-chlorinated polyolefin materials (Auroren®S5106-S) are extruded onto a paper base substrate using a ¾" recirculator screw run at between 350° F. (177° C.) and 390° F. (199° C.). The extrusions are done with a 10" wide extrusion die and a 12" wide Matte Finish primary cooling roll.

Such process is repeated several times using a mix of different level of components in view of producing different films. The mixture compositions are illustrated in table (c). The amounts are expressed in weight percentage (wt %) of the total weight of material.

TABLE c

| Example ID | Wt % of Auroren ®S5106-S | Wt % of LDPE | Wt % of Ansilex ® |
|---|---|---|---|
| Ex 5 | — | 100 | — |
| Ex 6 | 1 | 99 | — |
| Ex 7 | — | 99 | 1 |
| Ex 8 | 1 | 98 | 1 |
| Ex 9 | — | 98 | 2 |
| Ex 10 | 2 | 96 | 2 |

Auroren ®S5106-S, available from Nippon Paper Group, is a polyolefin polymer modified with maleic anhydride and acrylic, with a molecular weight of 90000 and having a High Modification Level. Ansilex ®93 is calcined kaolin, available from BASF. LDPE is available from Westlake Chemicals.

EXAMPLE 4

Adhesion Test

A series of latex ink prints are made based on extruded films such as described in table (c) of example 3. The paper samples, coated with film materials such as described in example 3, are then printed on an HP L25500 (from Hewlett-Packard Corporation). Latex pigment inks for this printer were used, i.e., HP CH615A black ink, HP CH616A cyan ink, HP CH617A magenta ink, HP CH618A yellow ink, CH619A light cyan ink, and CH620A light magenta ink. The samples are then post-treated (dried) at 90° C. to ensure latex ink setting. The samples are then subjected to an adhesion test, using a "tape peel" test in which a piece of adhesive tape (3M tape #610) is applied to printed color blocks briefly and the tape is removed.

Figure 4:
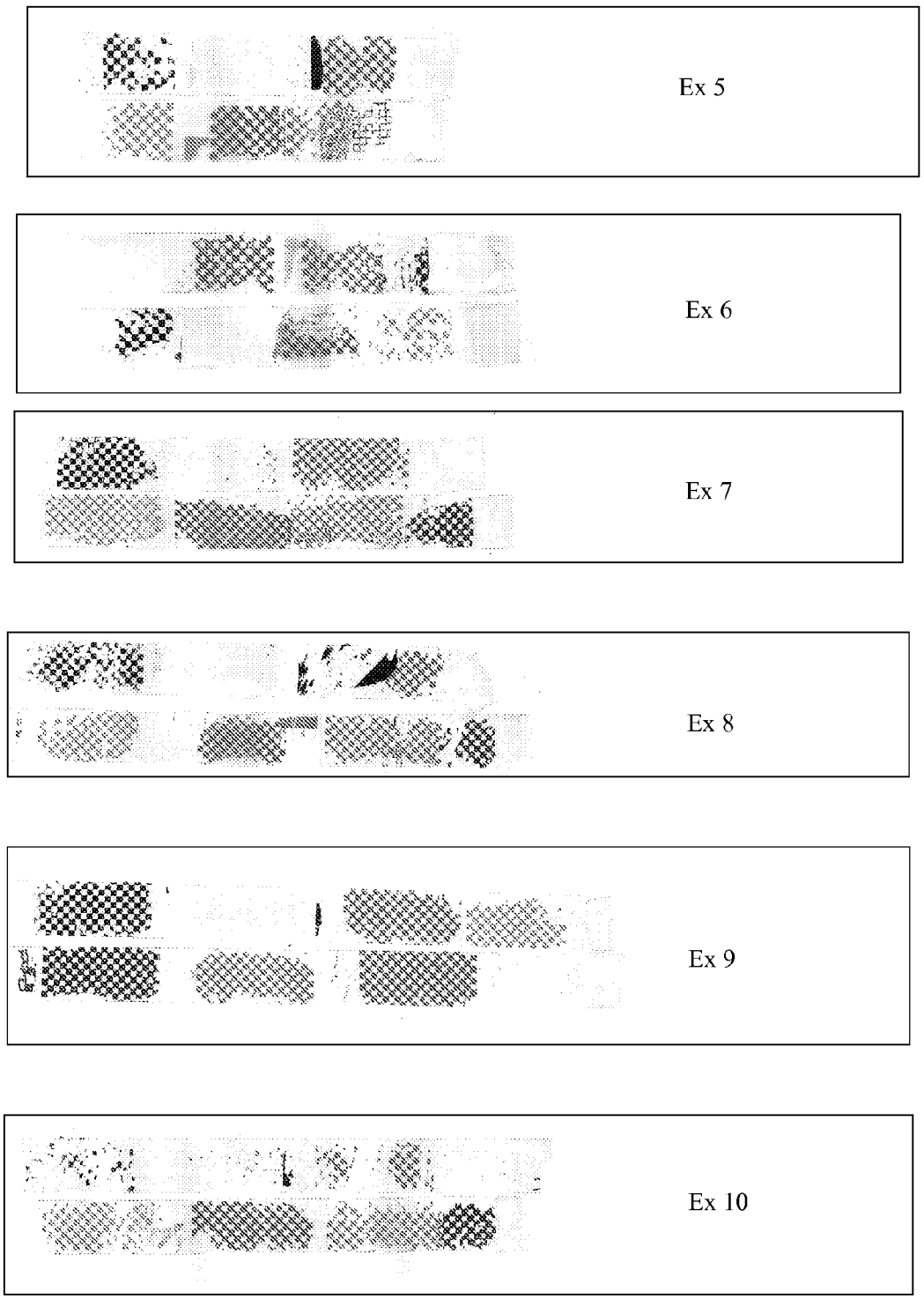

FIG. 4 illustrates the removed tape. The amount of ink transferred to the tape is visually analyzed and evaluations are reported in the table (d). In table (d), "−" indicates low levels of ink transfer to the tape and "+" indicates high levels of ink transfer. An improved adhesion is shown by lower amounts of ink transferred to the tape. The results are illustrated table (d).

TABLE d

| Example ID | Amounts of ink transferred to the tape. |
|---|---|
| Ex 5 | ++ |
| Ex 6 | − |
| Ex 7 | + |
| Ex 8 | − |
| Ex 9 | + |
| Ex 10 | −− |

Such results demonstrate that the addition of fillers to thermoplastic polymers slightly improves the adhesion of the latex-based ink to the material. Furthermore, the addition of non-chlorinated polyolefin materials, in combination with fillers, to thermoplastic polymers improves considerably the adhesion of the ink to the material.

EXAMPLE 5

Extruded Film Formation

A hot melt extrusion of EVA base thermoplastic polymers (Elvax® available from Dupont Chemical) with different levels of non-chlorinated polyolefin materials (Auroren®S 5106-S) are mixed and are extruded onto a paper base substrate using a ¾" recirculator screw run at between 350° F. (177° C.) and 480° F. (249° C.). The extrusions are done with a 10" wide extrusion die and a 12" wide Matte Finish primary chill roll.

Such process is repeated several times using a mix of different level of components in view of producing different films. The mixture compositions are illustrated in table (e). The amounts are expressed in weight percentage (wt %) of the total weight of material.

TABLE e

| Example ID | Wt % of Auroren ®S 5106-S | Wt % of Elvax ® |
|---|---|---|
| Ex 11A | — | 100 |
| Ex 11B | 0.5 | 99.5 |
| Ex 11C | 1 | 99 |

EXAMPLE 6

Adhesion Test

A series of latex ink prints are made based on extruded films such as described in table (e) of example 5. The paper samples, coated with such different film materials, are then printed on an HP L25500 printer (from Hewlett-Packard Corporation). Latex-based pigment inks are used, i.e., HP CH615A black ink, HP CH616A cyan ink, HP CH617A magenta ink, HP CH618A yellow ink, CH619A light cyan ink and CH620A light magenta ink. The printed samples are then post-treated (dried) at 90° C. to ensure latex ink setting. The printed samples are then subjected to an adhesion test, using a "tape peel" test in which a piece of adhesive tape (3M tape #610) is applied to printed color blocks briefly and the tape is removed.

Figure 5:
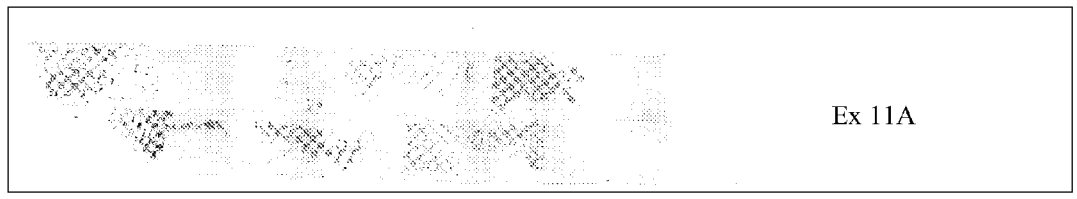
Figure 5:
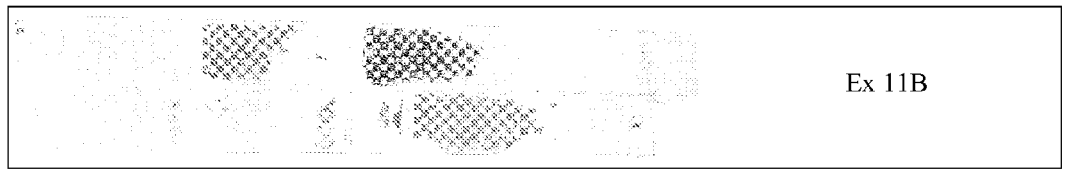
Figure 5:
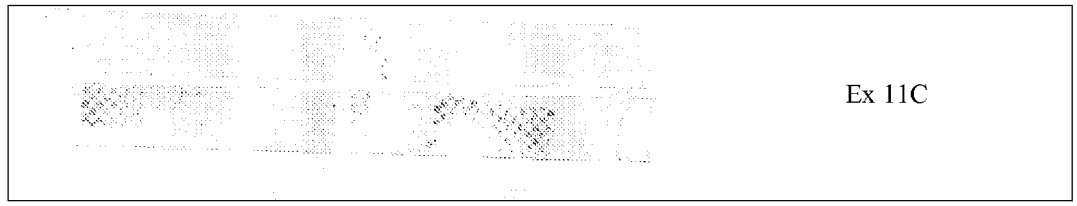

FIG. 5 illustrates the removed tape. The amount of ink transferred to the tape is visually analyzed and evaluations are reported in the table (f). In table (f), "−" indicates low levels of ink transfer to the tape and "+" indicates high levels of ink transfer. An improved adhesion is shown by lower amounts of ink transferred to the tape. The results are illustrated table (f).

TABLE f

| Example ID | Amounts of ink transferred to the tape. |
|---|---|
| Ex 11A | ++ |
| Ex 11B | + |
| Ex 11C | −− |

This results clearly demonstrate that the addition of non-chlorinated polyolefin materials to EVA thermoplastic polymer improve the ink adhesion to the media material containing the material according to the present disclosure.

What is claimed is:

1. An inkjet recording material, comprising:
a single layer of an extruded mixture of a thermoplastic base polymer and a non-chlorinated polyolefin material, wherein the non-chlorinated polyolefin material is selected from a maleic anhydride modified polyolefin and a maleic anhydride and acrylate modified polyoefin, and wherein the mixture includes from 0.5 wt % to 30 wt % of the non-chlorinated polyolefin material based on the total weight of the polymers constituting the inkjet recording material.

2. The inkjet recording material according to claim 1 wherein the thermoplastic base polymer is polyethylene (PE), polypropylene (PP), polyethylene terephthalate (PET), polystyrene, polycarbonate, polyamide polymers, or combinations thereof.

3. The inkjet recording material according to claim 1 wherein the thermoplastic base polymer is polyethylene (PE).

4. The inkjet recording material according to claim 1 wherein the thermoplastic base polymer is low density polyethylene (LDPE), high density polyethylene (HDPE), or combinations thereof.

5. The inkjet recording material according to claim 1 wherein the thermoplastic base polymer is ethylene vinyl acetate (EVA) polymer.

6. The inkjet recording material according to claim 1 which further comprises filler.

7. The inkjet recording material according to claim 1 which further comprises kaolin clay as filler.

8. The inkjet recording material according to claim 1 wherein the single layer has a thickness ranging between about 0.01 mm and about 0.15 mm.

9. A method of fabricating an inkjet recording material such as defined in claim 1 comprising the steps of:
preparing the mixture of the thermoplastic base polymer and of the non-chlorinated polyolefin material; and
extruding the mixture by:
subjecting the mixture to heat and pressure;
forming a molten curtain with the mixture; and
placing the molten curtain in contact with a supporting substrate to form the single layer on the supporting substrate, the single layer having a thickness ranging from about 0.01 mm to about 0.15 mm.

10. The method of fabricating an inkjet recording material according to claim 9 wherein the substrate is paper.

11. A method of forming printed images on inkjet recording material such as defined in claim 1 using a latex-based ink composition comprising the step of projecting a stream of droplets of the latex-based ink composition via inkjet printing technique onto said material to form the desired printed image.

12. A method of enhancing image quality and adhesion of an inkjet printed image, comprising the steps of:
a. firstly, obtaining an inkjet recording material comprising an extruded mixture of a non-chlorinated polyolefin material and of a thermoplastic base polymer, wherein the non-chlorinated polyolefin material is selected from a maleic anhydride modified polyolefin and a maleic anhydride and acrylate modified polyolefin;
b. then, inkjetting a latex-based ink composition onto said recording material, to form a printed image;
c. and drying the printed image, wherein the drying of the printed image allows the latex-based ink composition to set.

13. The method of fabricating an inkjet recording material according to claim 9 wherein a speed of the extruding step ranges from about 60 m/min to about 460 m/min.

14. The method of fabricating an inkjet recording material according to claim 9 wherein the extrusion process is extrusion coating, lamination, hot melt extrusion, modified cast extrusion, or coating extrusion.

15. The inkjet recording material according to claim 1 wherein the thermoplastic polymer is low density polyethylene, a combination of ethylene vinyl acetate and low density PE, or polypropylene.

* * * * *

UNITED STATES PATENT AND TRADEMARK OFFICE
CERTIFICATE OF CORRECTION

PATENT NO. : 8,628,166 B2
APPLICATION NO. : 13/384728
DATED : January 14, 2014
INVENTOR(S) : Molly Hladik et al.

It is certified that error appears in the above-identified patent and that said Letters Patent is hereby corrected as shown below:

In the Claims

In column 13, line 7, in Claim 1, delete "polyoefin," and insert -- polyloefin, --, therefor.

Signed and Sealed this
Twentieth Day of May, 2014

Michelle K. Lee
*Deputy Director of the United States Patent and Trademark Office*